United States Patent
Gustof et al.

(10) Patent No.: US 12,154,555 B2
(45) Date of Patent: Nov. 26, 2024

(54) DETECTING RELATED INFORMATION ON CALLS IN MULTI-TENANT SYSTEM AND FOR CONSENT BASED INFORMATION SHARING

(71) Applicant: MOTOROLA SOLUTIONS, INC., Chicago, IL (US)

(72) Inventors: Grzegorz Gustof, Myslenice (PL); Wojciech Wojcik, Cracow (PL); Piotr Furman, Grojec (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 203 days.

(21) Appl. No.: 17/756,624

(22) PCT Filed: Dec. 5, 2019

(86) PCT No.: PCT/PL2019/050074
§ 371 (c)(1),
(2) Date: May 27, 2022

(87) PCT Pub. No.: WO2021/112697
PCT Pub. Date: Jun. 10, 2021

(65) Prior Publication Data
US 2022/0415313 A1 Dec. 29, 2022

(51) Int. Cl.
*G10L 15/08* (2006.01)
*G06F 40/30* (2020.01)
(Continued)

(52) U.S. Cl.
CPC .......... *G10L 15/1815* (2013.01); *G06F 40/30* (2020.01); *G10L 15/1822* (2013.01);
(Continued)

(58) Field of Classification Search
None
See application file for complete search history.

(56) References Cited

U.S. PATENT DOCUMENTS 7,639,634 B2   12/2009  Shaffer et al.
9,615,218 B2*   4/2017  Mazzarella ........... H04W 4/021
(Continued)

FOREIGN PATENT DOCUMENTS

WO     2019132682 A1    7/2019

OTHER PUBLICATIONS

International Search Report and Written Opinion for Application No. PCT/PL2019/050074 dated Aug. 7, 2020 (13 pages).

*Primary Examiner* — Richard Z Zhu
(74) *Attorney, Agent, or Firm* — Michael Best & Friedrich LLP

(57) ABSTRACT

Methods and systems for consent based information sharing. One system includes a server including an electronic processor configured to receive a first set of parsed communication data for a first talkgroup and a second set of parsed communication data for a second talkgroup. The electronic processor is configured to determine a topic of interest of the first talkgroup. The electronic processor is configured to identify relevant communication data from the second set of parsed communication data, where the relevant communication data is relevant to the topic of interest. The electronic processor is configured to determine whether the relevant communication data is shareable. The electronic processor is configured to, in response to determining that the relevant communication data is not shareable, request consent from the first talkgroup and the second talkgroup to share the relevant communication data, and, in response to receiving consent, enable sharing of the relevant communication data.

17 Claims, 4 Drawing Sheets

(51) Int. Cl.
   *G10L 15/18* (2013.01)
   *G10L 15/19* (2013.01)
   *G06F 40/35* (2020.01)
   *G10L 15/02* (2006.01)
   *G10L 15/20* (2006.01)
   *G10L 15/26* (2006.01)
   *H04W 12/80* (2021.01)

(52) U.S. Cl.
   CPC .............. *G10L 15/19* (2013.01); *G06F 40/35* (2020.01); *G10L 15/02* (2013.01); *G10L 15/08* (2013.01); *G10L 15/20* (2013.01); *G10L 15/26* (2013.01); *H04W 12/80* (2021.01)

(56) References Cited

U.S. PATENT DOCUMENTS

| | | | |
|---|---|---|---|
| 9,794,761 B2* | 10/2017 | Mazzarella | H04W 4/021 |
| 9,998,895 B1* | 6/2018 | Schuler | H04W 4/02 |
| 10,178,708 B1 | 1/2019 | Gan et al. | |
| 10,347,293 B1* | 7/2019 | Skinner | G06F 3/1462 |
| 10,469,275 B1* | 11/2019 | Broomall | H04L 51/52 |
| 11,216,783 B2 | 1/2022 | Schuler et al. | |
| 11,395,108 B2* | 7/2022 | Kee | H04W 4/08 |
| 2007/0202907 A1* | 8/2007 | Shaffer | H04W 4/08 455/518 |
| 2015/0095414 A1* | 4/2015 | Turbin | H04L 67/535 709/204 |
| 2015/0310730 A1* | 10/2015 | Miller | H04L 41/065 340/539.13 |
| 2016/0307286 A1 | 10/2016 | Miasnik et al. | |
| 2018/0357073 A1* | 12/2018 | Johnson | H04M 1/72403 |
| 2019/0005978 A1 | 1/2019 | Barnett et al. | |
| 2019/0149959 A1* | 5/2019 | Kee | G10L 13/02 704/258 |
| 2020/0329348 A1* | 10/2020 | Halun | H04W 4/029 |
| 2021/0344622 A1* | 11/2021 | Mann | G06Q 10/06313 |

* cited by examiner

DETECTING RELATED INFORMATION ON CALLS IN MULTI-TENANT SYSTEM AND FOR CONSENT BASED INFORMATION SHARING

BACKGROUND OF THE INVENTION

Public safety and other organizations use portable communications devices (for example, land mobile radios) to facilitate communication between their members. To streamline communication, organization members may be assigned to or associated with different communication groups (sometimes referred to as "talkgroups"). Talkgroups provide virtual radio channels in digital radio systems for use by subsets of users of a communications network. Members of a talkgroup are able to communicate with one another using push-to-talk (PTT) communications. For example, to send a communication to a group of members, a member sends a single communication to an assigned talkgroup rather than sending a communication to individual members. Talkgroup communications are kept within the talkgroup and are not transmitted to others using the same communications network who are not members of the talkgroup.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
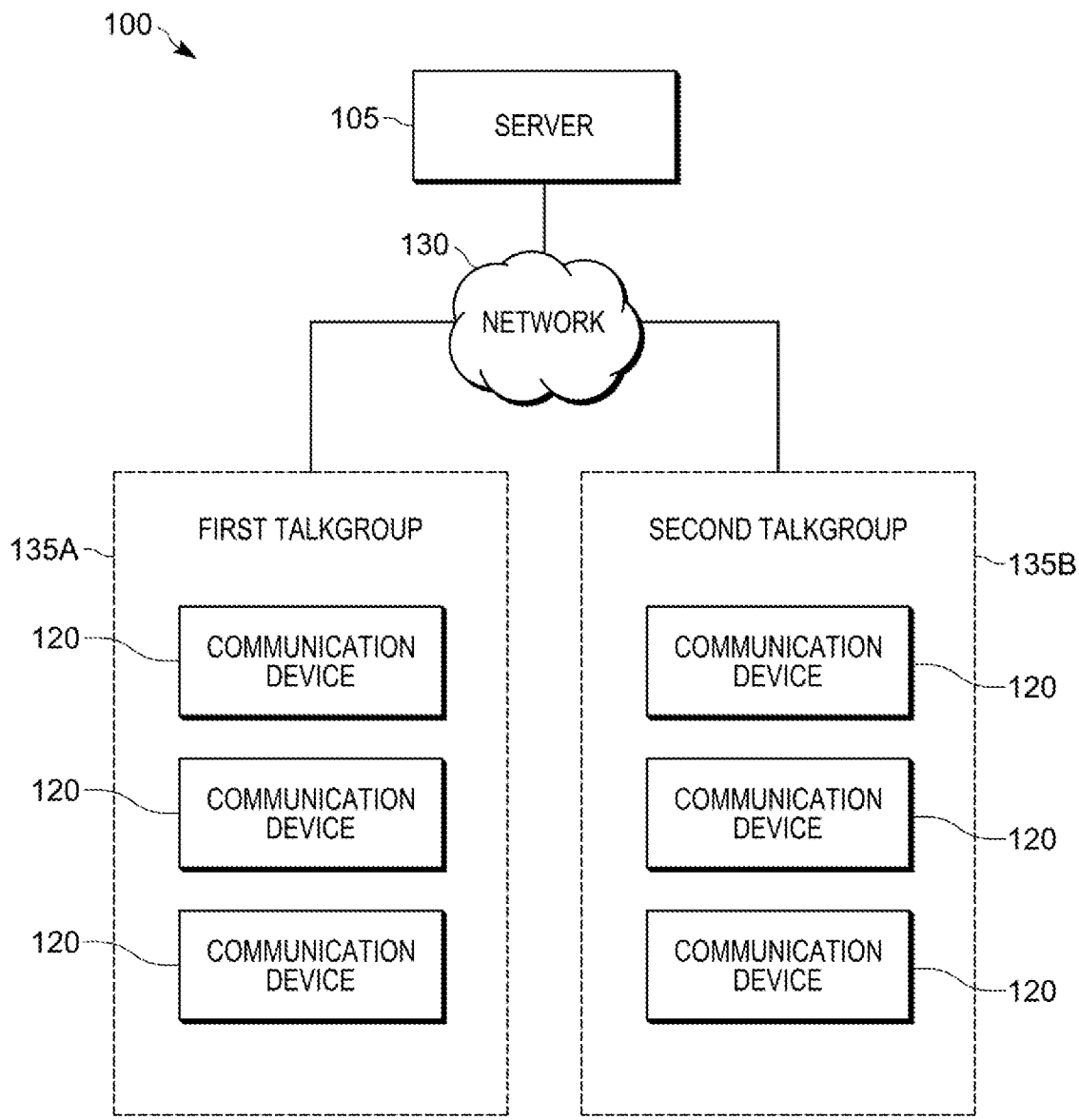
FIG. 1 is a block diagram of a multi-tenant communication system for consent based information sharing according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Multi-tenant communication systems generally have access to many clients' data and calls. For privacy and security reasons, default client data and calls are separated such that one client does not have access to another client's calls. For example, as noted above talkgroup communications are kept within the talkgroup and are not transmitted to others using the same communications network who are not members of the talkgroup. However, in some situations, information shared on calls within one tenant system (for example, communications within a talkgroup) may be relevant or important to users of another tenant system. In such situations, users of the two different tenant systems may exchange the relevant or important information provided that the users knew that the other user may benefit from knowing the relevant or important information.

As an example use case, suppose a first police officer is patrolling an area in Scottsdale. The first police officer uses a default talkgroup entitled TG_SD1. A crime was committed a few hours ago and witnesses report that a very tall man in a red jacket was seen fleeing the scene in a stolen green luxury vehicle. The first police officer continues collecting statements from witnesses in the area. Concurrently, a bot (for example, a virtual partner or an electronic digital assistant) on a communication device of the first police officer detects that the keywords "robber," "tall," "red jacket," and "luxury vehicle" were used multiple times during the first police officer's conversations with witnesses. In the meantime, a suspect is spotted in Phoenix. Another bot (for example, a multi-tenant communication system bot) detects that these keywords ("robber," "tall," "red jacket," and "luxury vehicle") were mentioned on another talkgroup entitled TG3_PHX in Phoenix. Scottsdale and Phoenix are two different clients (or tenants). Therefore, these talkgroups are not merged or patched. However, if the users knew that the other user may benefit from knowing the information, the users of the two different talkgroups may exchange the information.

Accordingly, the current architecture of talkgroup technology hinders that availability and accessibility of information, which results in an incomplete or limited information base available to users. In other words, current talkgroup technology results in information being siloed. One proposed solution to this technological problem is to connect two different systems with an intersystem gateway where law enforcement personnel or dispatches for each system exchange information verbally and patch talkgroups from different systems when deemed necessary. This requires constant monitoring of talkgroups from different systems by a single individual. A single individual monitoring talkgroups from different systems is impractical due to the size complexities of multi-tenant communication systems, such as the large number of tenants, the large number of calls and client data, and the like. Additionally, this opens the system up to human error, human frailties, and inefficiencies.

To solve these and other problems, embodiments described herein provide, among other things, methods and systems of consent based information sharing. For example, some embodiments described herein detect relevant information on calls within two different tenant systems (for example, two different talkgroups). Some embodiments inform the users associated with the calls having the relevant information (without sharing any confidential data) about the existence of the relevant information and a possibility to exchange relevant information. After receiving consent from the users of the two different tenant systems, the embodiments described herein create an opportunity to exchange the relevant information.

For example, with reference to the example use case described above, embodiments described herein may inform users of each talkgroup (in example, TG_LA1 and TG3_PHX) that "There is possibility that other party can provide more information regarding tall man in red jacket driving a green luxury vehicle. Do you agree to share data about this incident?" When both users agree, the embodiments described herein may enable information sharing. Information sharing may include, for example, sharing previously-gathered information without involving officers (for example, automatically broadcasting a summary of the previously-gathered information). As another example, information sharing may include creating a multi-tenant group call (or talkgroup) specifically for the officers associated with the relevant or important information.

Accordingly, the embodiments described herein address, among other things, a need for improved availability and accessibility of information in the field of talkgroup technology. The embodiments described herein provide, among other things, a fuller information base, which is accessible via one or more talkgroups, by enabling sharing of relevant information according to a set of rules. For example, some embodiments provide a technical solution to the technical problem of how to improve availability and accessibility of information with increased efficiency and accuracy. In other words, the embodiments described herein provide a technical improvement in the technology area of multi-tenant communication systems (including, for example, the field of talkgroup technology) with respect to information availability and accessibility across different tenants or talkgroups.

One example embodiment provides multi-tenant communication system for consent based information sharing. The multi-tenant communication system includes a server including an electronic processor configured to receive a first set of parsed communication data for a first talkgroup. The electronic processor is also configured to receive a second set of parsed communication data for a second talkgroup. The electronic processor is also configured to determine a topic of interest of the first talkgroup from the first set of parsed communication data for the first talkgroup. The electronic processor is also configured to identify relevant communication data from the second set of parsed communication data for the second talkgroup, where the relevant communication data is relevant to the topic of interest of the first talkgroup. The electronic processor is also configured to determine whether the relevant communication data is shareable. The electronic processor is also configured to, in response to determining that the relevant communication data is not shareable, request consent from the first talkgroup and the second talkgroup to share the relevant communication data, and, in response to receiving consent from the first talkgroup and the second talkgroup, enable sharing of the relevant communication data.

Another example embodiment provides a method for consent based information sharing. The method includes receiving, with an electronic processor, a first set of parsed communication data for a first talkgroup. The method also includes receiving, with the electronic processor, a second set of parsed communication data for a second talkgroup. The method also includes determining, with the electronic processor, a topic of interest of the first talkgroup from the first set of parsed communication data. The method also includes identifying, with the electronic processor, relevant communication data from the second set of parsed communication data for the second talkgroup, where the relevant communication data is relevant to the topic of interest of the first talkgroup. The method also includes determining, with the electronic processor, whether the relevant communication data is shareable. The method also includes, in response to determining that the relevant communication data is not shareable, requesting, with the electronic processor, consent from the first talkgroup and the second talkgroup to share the relevant communication data, and, in response to receiving consent from the first talkgroup and the second talkgroup, enabling, with the electronic processor, sharing of the relevant communication data.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of a multi-tenant communication system 100 for consent based information sharing in accordance with some embodiments. In the illustrated example, the communication system 100 includes a server 105 and a plurality of communication devices 120 (referred to herein, collectively, as "the communication devices 120" and, individually as "the communication device 120").

In the example illustrated in FIG. 1, the communication devices 120 are divided into two different talkgroups (or tenant systems), a first talkgroup 135A and a second talkgroup 135B. As used in the present application, the term "talkgroup" refers to a virtual radio channel that is used for communication among a group of communication devices (for example, the communication devices 120). For example, within land mobile radio and other wireless networks, talkgroups are used to organize and streamline communications. Members of a talkgroup are able to communicate with one another using push-to-talk (PTT) communications. Talkgroup communications are kept within the talkgroup and are not transmitted to others using the same communications network who are not members of the talkgroup. For example, to send a communication to a group of members, a member sends a single communication to an assigned talkgroup rather than sending a communication to individual members.

In some embodiments, the communication system 100 includes fewer, additional, or different components than those illustrated in FIG. 1 in various configurations and may perform additional functionality than the functionality described herein. For example, in some embodiments, the communication system 100 includes additional talkgroups, such as a third talkgroup, a fourth talkgroup, and the like. Alternatively or in addition, in some embodiments, the first talkgroup 135A and the second talkgroup 135B includes additional or fewer communication devices 120 than illustrated in FIG. 1.

The server 105 and the communication devices 120 communicate through a network 130. In some embodiments, the network 130 is a wide area network (WAN) (for example, a transport control protocol/internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, and the like). In other embodiments, the network 130 is a local area network (LAN), a neighborhood area network (NAN), a home area network (HAN), or a personal area network (PAN) employing any of a variety of communications protocols, such as Wi-Fi, Bluetooth, ZigBee, and the like. Other wide area networks, such as land mobile radio (LMR), terrestrial trunked radio (TETRA), and digital mobile radio (DMR) may also be used.

In still other embodiments, the network 130 is a radio access network (RAN). In such embodiments, the network 130 operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

Figure 2:
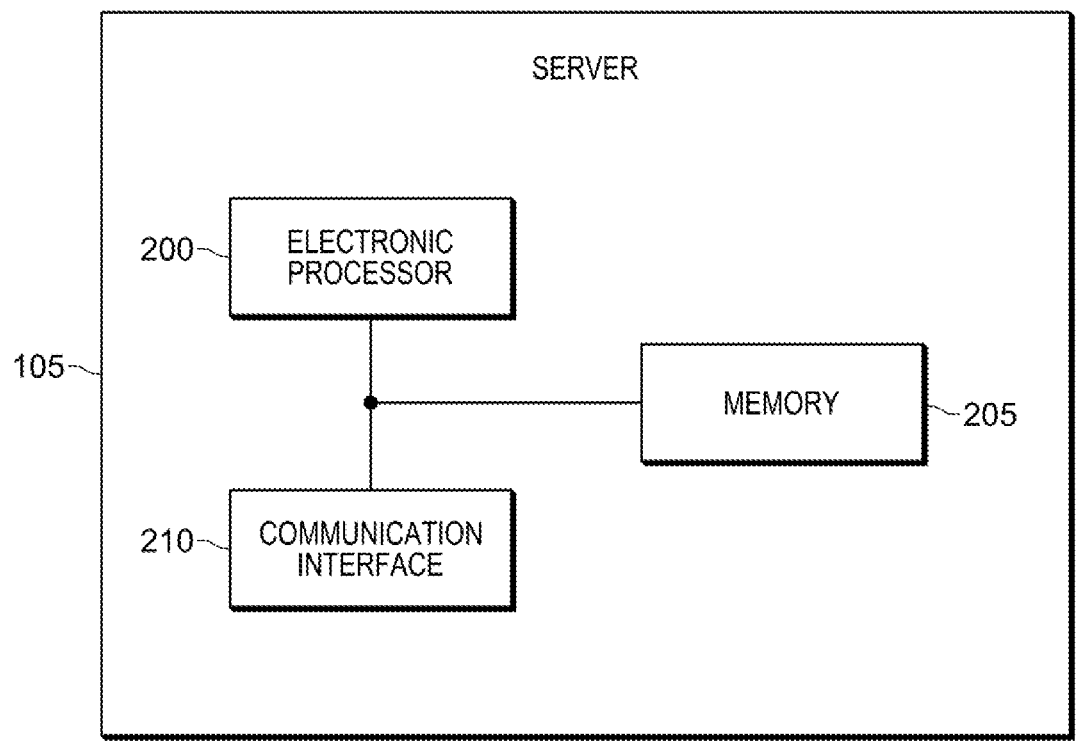
FIG. 2 is a block diagram of a server included in the communication system of FIG. 1 according to some embodiments.

FIG. 2 is a block diagram of the server 105 in accordance with some embodiments. The server 105 includes an electronic processor 200 (for example, a microprocessor, an application-specific integrated circuit (ASIC), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. FIG. 2 illustrates only one exemplary embodiment of the server 105. The server 105 may include additional components than those illustrated in FIG. 2 in various configurations and may perform additional functionality than the functionality described herein. For example, in some embodiments, the functionality described herein as being performed by the server 105 may be distributed among multiple servers or devices (for example, one or more electronic processors).

The communication interface 210 allows the server 105 to communicate with devices external to the server 105. For example, as illustrated in FIG. 1, the server 105 may communicate with one or more of the communication devices 120 included in the first talkgroup 135A, one or more of the communication devices 120 included in the second talkgroup 135B, or a combination thereof through the network 130. Communications through the network 130 may be protected using one or more encryption techniques, such as those techniques provided in the Institute of Electrical and Electronic Engineers (IEEE) 802.1 (www.ieee802.org/1/) standard for port-based network security, pre-shared key, Extensible Authentication Protocol (EAP), Wired Equivalency Privacy (WEP), Temporal Key Integrity Protocol (TKIP), Wi-Fi Protected Access (WPA), and the like. The connections between the communication interface 210 and the network 130 are, for example, wired connections, wireless connections, or a combination of wireless and wired connections. Accordingly, the communication interface 210 may include a port for receiving a wired connection to an external device (for example, a universal serial bus (USB) cable and the like), a transceiver for establishing a wireless connection to an external device (for example, over the network 130), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

Figure 3:
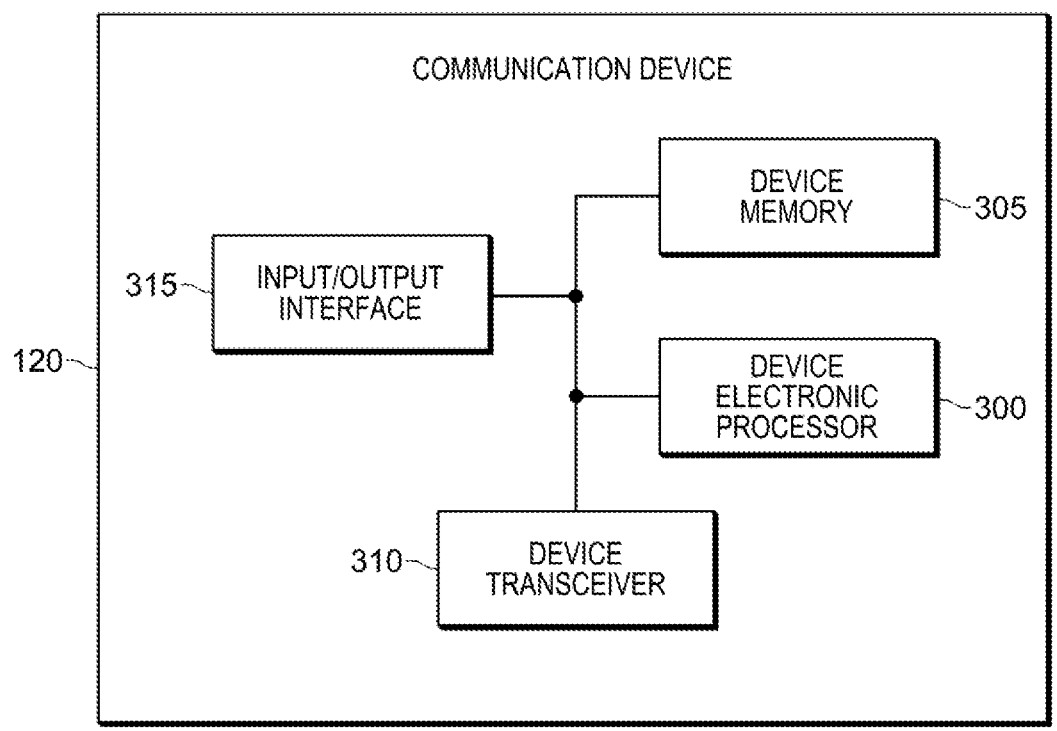
FIG. 3 is a block diagram of a communication device included in the communication system of FIG. 1 according to some embodiments.

FIG. 3 is a block diagram of the communication device 120 in accordance with some embodiments. The communication device 120 includes a device electronic processor 300 (for example, a microprocessor, an application-specific integrated circuit (ASIC), or another suitable electronic device), a device memory 305 (for example, a non-transitory, computer-readable medium), a device transceiver 310, and a device input/output interface 315. The device electronic processor 300, the device memory 305, the device transceiver 310, and the device input/output interface 315 communicate wirelessly, over one or more communication lines or buses, or a combination thereof. FIG. 3 illustrates only one exemplary embodiment of the communication device 120. The communication device 120 may include additional components than those illustrated in FIG. 3 in various configurations and may perform additional functionality than the functionality described herein.

The device electronic processor 300 may be implemented in various ways including ways that are similar to those described above with respect to the electronic processor 200. Likewise, the device memory 305 may be implemented in various ways including ways that are similar to those described with respect to the memory 205. The device memory 303 may store instructions that are received and executed by the device electronic processor 300 to carry out the functionality described herein.

The device transceiver 310 enables wireless communication from the communication device 120 to, for example, the server 105 via the communication network 130. In other embodiments, rather than the device transceiver 310, the communication device 120 may include separate transmitting and receiving components, for example, a transmitter and a receiver. For example, in some embodiments, the communication device 120 includes a mobile device transmitter. The mobile device transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the mobile device transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP)

application may be implemented. Direct mode LTE standards may additionally or alternatively be implemented as well, including but not limited to the LTE Direct device-to-device standard.

The device input/output interface 315 may include one or more input mechanisms (for example, a microphone, a touch screen, a keypad, a button, a knob, a push-to-talk (PTT) selection mechanism, and the like), one or more output mechanisms (for example, a display, a speaker, and the like), or a combination thereof.

In some embodiments, the communication devices 120 further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information.

As some existing examples, electronic digital assistants such as ViQi™ provided Motorola Solutions, Siri™ provided by Apple, Inc., and Google Assistant™ provided by Google LLC, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

As noted above, the device electronic processor 300 is configured to access and execute computer-readable instructions ("software") stored in the device memory 305. The software may include firmware, one or more applications, program data, filters, rules, one or more program modules, and other executable instructions. For example, the software may include instructions and associated data for performing a set of functions, including the methods described herein.

For example, in some embodiments, the device electronic processor 300 is configured to monitor (or detect) communication data associated with the communication device 120. The device electronic processor 300 may monitor communication data via one or more of the input mechanisms included in the device input/output interface 315, such as a microphone, a PTT selection mechanism, and the like. The communication data may include communications between members of a talkgroup. Alternatively or in addition, the communication data may include communications between a member of a talkgroup and a non-member of the talkgroup, such as face-to-face conversations between an investigating law enforcement officer and a witness or bystander. The device electronic processor 300 may parse the communication data into a set of parsed communication data (for example, a first set of parsed communication data, a second set of parsed communication data, and the like). A set of parsed communication data may include a context of the monitored communication data, one or more keywords of the monitored communication data, and the like. For example, after monitoring the communication data associated with a talkgroup, the device electronic processor 300 may analyze the monitored communication data to determine a context of the communication data, one or more keywords associated with the communication data, or a combination thereof. The device electronic processor 300 may aggregate the determined context, the determined one or more keywords, or a combination thereof into a set of parsed communication data for transmission to the server 105.

Figure 4:
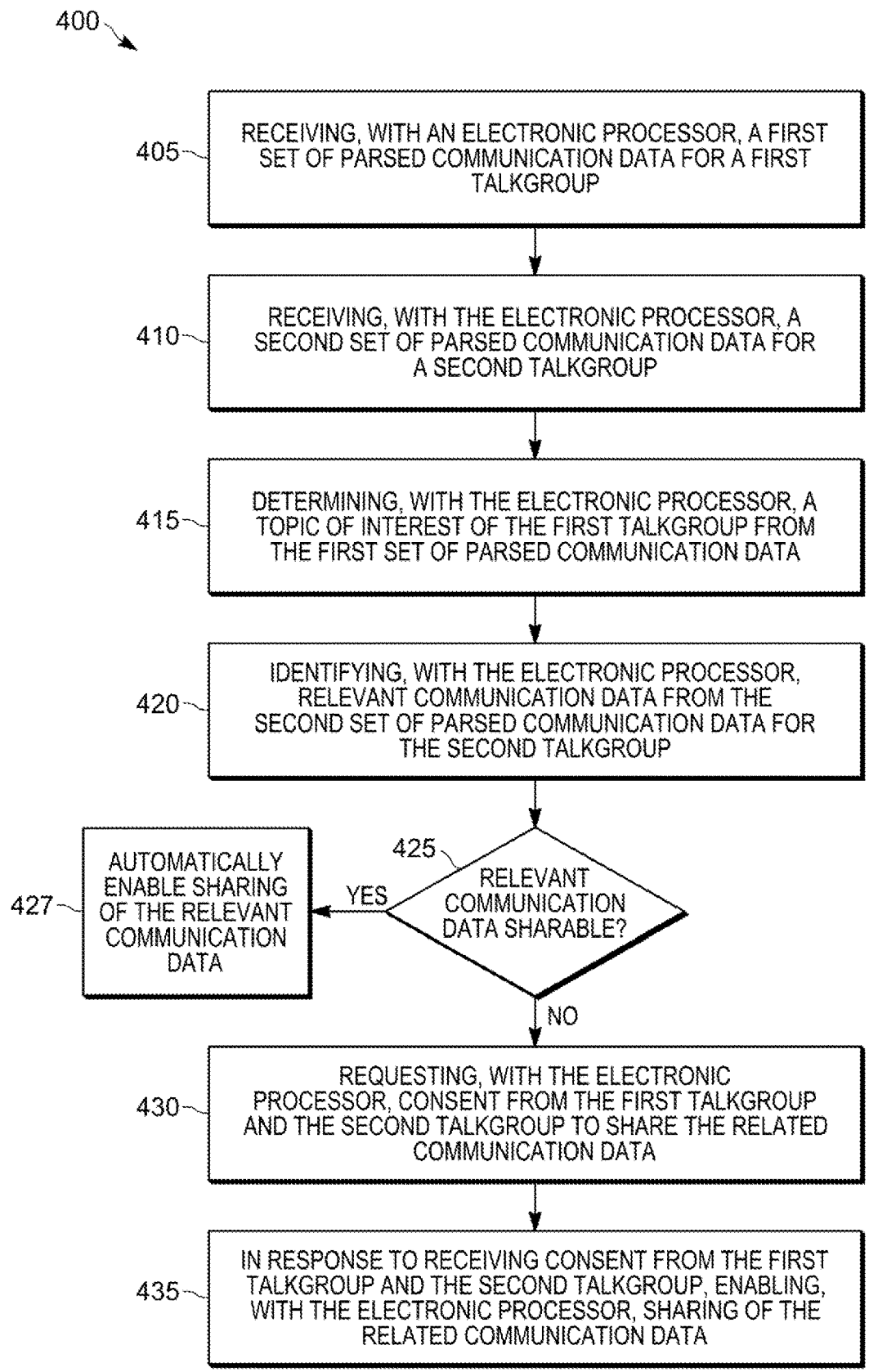
FIG. 4 is a flowchart illustrating a method of consent based information sharing using the communication system of FIG. 1 according to some embodiments.

FIG. 4 is a flowchart illustrating a method 400 of consent based information sharing according to some embodiments. The method 400 is described herein as being performed by the server 105 (the electronic processor 200 executing instructions). However, as noted above, the functionality performed by the main computing device 105 (or a portion thereof) may be performed by other devices, including, for example, one or more of the communication devices 120 (via the device electronic processor 300 executing instructions).

As illustrated in FIG. 4, the electronic processor 200 receives a first set of parsed communication data for the first talkgroup 135A (at block 405) and receives a second set of parsed communication data for the second talkgroup 135B (at block 410). As noted above, a set of parsed communication data may include a context of monitored communication data, one or more keywords of monitored communication data, or a combination thereof. The electronic processor 200 receives the first set of parsed communication data from one or more of the communication devices 120 included in the first talkgroup 135A and the second set of parsed communication data from one or more of the communication devices 120 included in the second talkgroup 135B. In some embodiments, the electronic processor 200 receives additional or different sets of parsed communication data. For example, in some embodiments, the electronic processor 200 receives a third set of parsed communication data from a communication device 120 included in a third talkgroup different from the first talkgroup 135A and the second talkgroup 135B. In some embodiments, the electronic processor 200 stores the first set of parsed communication data, the second set of parsed communication data, another set of parsed communication data, or a combination thereof.

After receiving at least the first set of parsed communication data (at block 405), the electronic processor 200 determines a topic of interest of the first talkgroup 135A from the first set of parsed communication data (at block 415). A topic of interest of a talkgroup includes a topic in which the members of that talkgroup are interested in. For example, a topic of interest may include a specific crime, a specific suspect, and the like. In some embodiments, the electronic processor 200 determines a topic of interest based on the data included in a set of parsed communication data. For example, when a set of parsed communication data includes the context and keywords "robber," "tall," and "red jacket," the electronic processor 200 may determine that the topic of interest is a suspect who is tall, wearing a red jacket, and is suspected of robbery.

In other embodiments, the electronic processor 200 determines the topic of interest of the first talkgroup 135A based on an indication of a topic of interest included in the first set of parsed communication data. For example, in some embodiments, the device electronic processor 300 determines a topic of interest when analyzing the monitored communication data and includes an indication of the topic of interest in the set of parsed communication data transmitted to the server 105. In other words, in some embodiments, the set of parsed communication data includes an indication of a topic of interest in addition to or alternatively to the context of the monitored communication data, the one or more keywords of the monitored communication data, or a combination thereof.

After determining the topic of interest (in block 415), the electronic processor 200 identifies relevant communication data from the second set of parsed communication data for the second talkgroup 135B (at block 420). Relevant communication data includes data that is important or relevant to a topic of interest for a talkgroup. For example, where the topic of interest relates to a suspect who is tall and is wearing a red jacket, relevant communication data may include data relating to a suspect who is tall and is wearing a red jacket.

The electronic processor 200 may identify relevant communication data by searching for the relevant communication data in other sets of parsed communication data received from other talkgroups (for example, other tenants or systems included in the multi-tenant communication system 100). For example, as noted above, in some embodiments, the electronic processor 200 stores the sets of parsed communication data. Accordingly, the electronic processor 200 may search the stored sets of parsed communication data for relevant communication data to the determined topic of interest. For example, where the topic of interest relates to a suspect who is tall and is wearing a red jacket, the electronic processor 200 may search through sets of parsed communication data for a set of parsed communication data that includes data (for example, a context or one or more keywords) relating to a suspect who is tall and wearing a red jacket.

In some embodiments, the electronic processor 200 searches for the relevant communication data in other sets of parsed communication data based on a time window (for example, a look-back time window). The time window defines how far back in time the electronic processor 200 should search for the relevant communication data (for example, fifteen minutes, two hours, a day, and the like). A duration of the time window may be a fixed predetermined duration. However, in other embodiments, a duration of the time window is dynamically varied. The duration of the time window may be varied based on, for example, a topic of interest, an availability of system resources, and the like. The electronic processor 200 may set a duration of the time window based on the topic of interest, an availability of system resources, another factor, or a combination thereof. For example, when the topic of interest is a high priority, such as a shooting involving a law enforcement officer, the electronic processor 200 may increase the duration of the time window. As another example, when the electronic processor 200 determines that system resources are limited, the electronic processor 200 may decrease the duration of the time window.

Whether a set of parsed communication data is included in the time window may depend on when the set of parsed communication data is received. For example, when a set of parsed communication data is received within the time window, the electronic processor 200 searches the set of parsed communication data for relevant communication data.

In some embodiments, a set of parsed communication data may include a plurality of subsets of parsed communication data, where each subset of parsed communication data is transmitted to and received by the electronic processor 200 at different points in time from the same talkgroup or tenant system. In other words, in some embodiments, the electronic processor 200 identifies the relevant communication data by analyzing a subset of a set of parsed communication data, where the subset includes parsed communication data received during the time window from a communication device 120 included in another talkgroup or tenant system. For example, the electronic processor 200 may analyze a subset of the second set of parsed communication data, where the subset of the second set of parsed communication data was received during the time window from a communication device 120 included in the second talkgroup 135B.

In some embodiments, after determining the topic of interest (at block 415), the electronic processor 200 continuously monitors sets of parsed communication data received after determining the topic of interest. Accordingly, the electronic processor 200 may search previously received parsed communication data for relevant communication data, continuously monitor or search new incoming parsed communication data for relevant communication data, or a combination thereof.

After identifying the relevant communication data, the electronic processor 200 determines whether the relevant communication data is shareable (at block 425). Whether the relevant communication data is shareable may depend on the content of the relevant communication data, a data sharing regulation or rule, and the like. For example, where the relevant communication data includes confidential information, such as a social security number or a suspects identify, and the involved agency has a data sharing regulation or rule against sharing such confidential information, the electronic processor 200 may determine that the relevant communication data is not shareable. In contrast, where the relevant communication data does not include confidential information (for example, the relevant communication data merely includes a general description of a vehicle and a last seen location of the vehicle), the electronic processor 200 may determine that the relevant communication data is shareable.

Accordingly, in some embodiments, whether relevant communication data is shareable depends on a confidentiality status of the relevant communication data. In such embodiments, the electronic processor 200 determines a confidentiality status of the relevant communication data and determines whether the relevant communication data is shareable based on the confidentiality status of the relevant communication data. Alternatively or in addition, in some embodiments, whether relevant communication data is shareable depends on an applicable data sharing regulation. In such embodiments, the electronic processor 200 determines an applicable data sharing regulation (for example, based on an involved agency) and determines whether the relevant communication data is shareable based on the applicable data sharing regulation.

In response to determining that the relevant communication data is shareable, the electronic processor 200 automatically enables sharing of the relevant communication data (at block 427). In some embodiments, the electronic processor 200 enables sharing of the relevant communication data without involving users of the first talkgroup 135A and the second talkgroup 135B. In other words, the electronic processor 200 may enabling sharing of the relevant communication data by transmitting the relevant communication data to one or more talkgroups (for example, the first talkgroup 135A, the second talkgroup 135B, or a combination thereof) for presentation of the relevant communication data to the one or more talkgroups. For example, the electronic processor 200 may automatically broadcast or present the relevant information as an automated summary of the relevant information. As another example, the electronic processor 200 may automatically broadcast or present the relevant information by replaying a conversation associated with the relevant communication data.

Alternatively or in addition, the electronic processor 200 enables sharing of the relevant communication data by creating a multi-tenant group call or a talkgroup specifically for the topic of interest for the users involved with the topic of interest, the relevant communication data, or a combination thereof. For example, the electronic processor 200 may enable sharing of the relevant communication data by creating a new talkgroup associated with the topic of interest. The electronic processor 200 may further join one or more users of the first talkgroup 135A and the second talkgroup 135B to the new talkgroup associated with the topic of interest.

In response to determining that the related communication data is not shareable, the electronic processor 200 may request consent from the first talkgroup 135A and the second talkgroup 135B to share the related communication data (at block 430). The electronic processor 200 may request consent by generating and transmitting a consent request to the first talkgroup 135A, the second talkgroup 135B, or a combination thereof. The consent request may include, for example, an indication of an opportunity to share relevant information, an indication of the topic of interest, an identification of an involved talkgroup, an identification of an involved user, an identification of an involved agency, and the like. For example, where the topic of interest involves a tall man in a red jacket driving a green luxury vehicle, the request consent may inform users of each talkgroup that "There is possibility that another party can provide more information regarding tall man in red jacket driving a green luxury vehicle. Do you agree to share data about this incident?" In response to receiving the consent request, one or more users of the involved talkgroups (for example, first talkgroup 135A and the second talkgroup 135B) may agree to share relevant communication data or decline to share relevant communication data. A user may respond to the consent request via the input/output interface 315 of the communication device 120. For example, a user may verbally indicate (via a microphone of the communication device 120) whether the user agrees or declines to share relevant communication data. As another example, a user may indicate (via a button of the communication device 120) whether the user agrees or declines to share relevant communication data.

In response to receiving consent from the first talkgroup 135A and the second talkgroup 135B, the electronic processor 200 enables sharing of the related communication data (at block 435). After receiving consent from the first talkgroup 135A and the second talkgroup 135B, the electronic processor 200 may enable sharing of the related communication data in various ways including ways that are similar to those described with respect to block 427. In some embodiments, when consent is not received from both the first talkgroup 135A and the second talkgroup 135B, the electronic processor 200 may generate and transmit a decline notification to the first talkgroup 135A, the second talkgroup 135B, or a combination thereof indicating that sharing of the relevant communication data was declined.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A multi-tenant communication system for consent based information sharing, the system comprising:
   a first talkgroup operating on a first tenant of the multi-tenant communication system;
   a second talkgroup operating on a second tenant of the multitenant communication system, wherein the first tenant is separated from the second tenant; and
   a server configured to receive parsed communications data from the first tenant and the second tenant;
   wherein the server includes an electronic processor configured to:
   receive a first set of parsed communication data for a first talkgroup,
   receive a second set of parsed communication data for a second talkgroup,
   determine a topic of interest of the first talkgroup from the first set of parsed communication data for the first talkgroup,
   identify relevant communication data from the second set of parsed communication data for the second talkgroup by analyzing a subset of the second set of parsed communication data, wherein the subset of the second set of parsed communication data includes parsed communication data received from a communication device during a time window, wherein the relevant communication data is relevant to the topic of interest of the first talkgroup, and wherein a duration of the time window is based on the topic of interest,
   determine whether the relevant communication data is shareable,
   in response to determining that the relevant communication data is not shareable,
   request consent from the first talkgroup and the second talkgroup to share the relevant communication data, and
   in response to receiving consent from the first talkgroup and the second talkgroup, enable sharing of the relevant communication data.

2. The system of claim 1, wherein the electronic processor is configured to enable sharing of the relevant communication data by transmitting the relevant communication data to the first talkgroup for presentation of the relevant communication data to the first talkgroup.

3. The system of claim 1, wherein the electronic processor is configured to enable sharing of the relevant communication data by creating a new talkgroup associated with the topic of interest.

4. The system of claim 1, wherein a duration of the time window is based on an availability of system resources.

5. The system of claim 1, wherein the electronic processor is further configured to, in response to determining that the relevant communication data is shareable, automatically enable sharing of the relevant communication data.

6. The system of claim 1, wherein the first talkgroup is part of a first tenant system and the second talkgroup is part of a second tenant system different from the first tenant system.

7. The system of claim 1, further comprising:
   a first communication device communicatively coupled to the server, the first communication device including a device electronic processor configured to
   monitor communication data associated with the first talkgroup,
   parse the communication data associated with the first talkgroup into the first set of parsed communication data, and
   transmit the first set of parsed communication data to the server.

8. The system of claim 7, wherein the monitored communication data associated with the first talkgroup includes communication between a member of the first talkgroup and a non-member of the first talkgroup.

9. The system of claim 7, wherein the first set of parsed communication data includes at least one selected from a group consisting of a context of the monitored communication data and a keyword of the monitored communication data.

10. The system of claim 1, wherein the electronic processor is configured to receive the first set of parsed communication data for the first talkgroup from a first communication device and receive the second set of parsed communication data for the second talkgroup from a second communication device, wherein the first communication device is part of the first tenant system and the second communication device is part of the second tenant system.

11. A method for consent based information sharing, the method comprising:
   receiving, with an electronic processor, a first set of parsed communication data for a first talkgroup operating on a first tenant of a multitenant communication system;
   receiving, with the electronic processor, a second set of parsed communication data for a second talkgroup operating on a second tenant of the multitenant communication system, wherein the first tenant is separated from the second tenant;
   determining, with the electronic processor configured to receive parsed communications data from the first tenant and the second tenant, a topic of interest of the first talkgroup from the first set of parsed communication data;
   identifying, with the electronic processor, relevant communication data from the second set of parsed communication data for the second talkgroup by analyzing a subset of the second set of parsed communication data, wherein the subset of the second set of parsed communication data includes parsed communication data received from a communication device during a time window, wherein the relevant communication data is relevant to the topic of interest of the first talkgroup, and wherein a duration of the time window is based on the topic of interest;

determining, with the electronic processor, whether the relevant communication data is shareable;

in response to determining that the relevant communication data is not shareable, requesting, with the electronic processor, consent from the first talkgroup and the second talkgroup to share the relevant communication data, and in response to receiving consent from the first talkgroup and the second talkgroup, enabling, with the electronic processor, sharing of the relevant communication data.

12. The method of claim 11, further comprising:

in response to determining that the relevant communication data is shareable, automatically enable sharing of the relevant communication data.

13. The method of claim 11, wherein enabling sharing of the relevant communication data includes transmitting the relevant communication data to the first talkgroup for presentation of the relevant communication data to the first talkgroup.

14. The method of claim 11, wherein enabling sharing of the relevant communication data includes creating a new talkgroup associated with the topic of interest.

15. The method of claim 11, wherein determining whether the relevant communication data is shareable includes determining a confidentiality status of the relevant communication data and determining whether the relevant communication data is shareable based on the confidentiality status of the relevant communication data.

16. The method of claim 11, wherein determining whether the relevant communication data is shareable includes determining an applicable data sharing regulation and determining whether the relevant communication data is shareable based on the applicable data sharing regulation.

17. The method of claim 11, wherein receiving the first set of parsed communication data for the first talkgroup includes receiving at least one selected from a group consisting of a context of monitored communication data associated with the first talkgroup and a keyword of the monitored communication data associated with the first talkgroup.

* * * * *